United States Patent
Sandmeyer

(10) Patent No.: US 9,604,384 B2
(45) Date of Patent: Mar. 28, 2017

(54) METHOD FOR MANUFACTURING A WEAKENING STRUCTURE IN A DECOR LAYER OF AN AIRBAG COVER, AND DECOR LAYER WITH A WEAKENING STRUCTURE OF AN AIRBAG COVER

(71) Applicant: Faurecia Innenraum Systeme GmbH, Hagenbach (DE)

(72) Inventor: Ulrich Sandmeyer, Dahn (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/735,730

(22) Filed: Jun. 10, 2015

(65) Prior Publication Data

US 2015/0360384 A1 Dec. 17, 2015

(30) Foreign Application Priority Data

Jun. 12, 2014 (DE) .......................... 10 2014 211 288

(51) Int. Cl.
*B60R 21/16* (2006.01)
*B26F 1/14* (2006.01)
*B60R 21/2165* (2011.01)
*B60R 21/215* (2011.01)
*B26F 1/16* (2006.01)

(52) U.S. Cl.
CPC ................. *B26F 1/14* (2013.01); *B26F 1/16* (2013.01); *B60R 21/215* (2013.01); *B60R 21/2165* (2013.01); *Y10T 83/0237* (2015.04)

(58) Field of Classification Search
CPC ............ B60R 2021/21506; B60R 2021/21652

USPC ........ 280/728.3, 732; 83/684; 156/250, 252, 156/253; 264/155, 156

See application file for complete search history.

(56) References Cited

U.S. PATENT DOCUMENTS

| 5,698,283 | A | * | 12/1997 | Yamasaki | ............... B29C 51/14 280/728.3 |
|---|---|---|---|---|---|
| 5,803,489 | A | * | 9/1998 | Nusshor | ............... B29C 59/007 280/728.3 |
| 5,935,143 | A | * | 8/1999 | Hood | ............. A61B 17/320068 604/22 |
| 7,497,463 | B2 | * | 3/2009 | Kaulbersch | ............... B26F 1/24 280/728.3 |
| 2002/0063417 | A1 | * | 5/2002 | Merrifield | ........... B60R 21/2165 280/732 |
| 2002/0130497 | A1 | * | 9/2002 | Sommer | ................ B26D 7/086 280/732 |
| 2004/0061262 | A1 | * | 4/2004 | Cowelchuk | ............ B26D 3/085 264/442 |

(Continued)

FOREIGN PATENT DOCUMENTS

DE 10055546 9/2001

*Primary Examiner* — Toan To
(74) *Attorney, Agent, or Firm* — Schwegman Lundberg & Woessner, P.A.

(57) ABSTRACT

The present invention relates to a method for manufacturing a weakening structure in a decor layer of an airbag cover, said weakening structure not being visible when observed from a viewed side. With the method, a punching tool penetrates into a rear side of the decor layer consisting of leather, said rear side being away from the viewed side, and thereby is simultaneously rotated about its longitudinal axis. A penetration depth of the punching tool which is smaller than the thickness of the decor layer is moreover maintained.

10 Claims, 1 Drawing Sheet

(56) References Cited

U.S. PATENT DOCUMENTS

| | | | |
|---|---|---|---|
| 2009/0243264 A1* | 10/2009 | Kaulbersch | B29C 59/007 280/728.3 |
| 2012/0091698 A1* | 4/2012 | Wolfe | B29C 43/203 280/732 |
| 2012/0315446 A1* | 12/2012 | Wisniewski | B32B 38/0004 428/195.1 |

* cited by examiner

METHOD FOR MANUFACTURING A WEAKENING STRUCTURE IN A DECOR LAYER OF AN AIRBAG COVER, AND DECOR LAYER WITH A WEAKENING STRUCTURE OF AN AIRBAG COVER

CLAIM OF PRIORITY

This application claims the benefit of priority of German Patent Application No. 10 2014 211 288.5, entitled "VERFAHREN ZUM HERSTELLEN EINER SCHWACHUNGSSTRUKTUR IN EINER DEKORLAGE EINER AIRBAGABDECKUNG UND DEKORLAGE MIT SCHWACHUNGSSTRUKTUR EINER AIRBAGABDECKUNG," filed on Jun. 12, 2014, the benefit of priority of which is claimed hereby, and which is incorporated by reference herein in its entirety.

TECHNICAL FIELD

The present document relates to a method for manufacturing a weakening structure in a decor layer of an airbag cover, and to a decor layer with a weakening structure of an airbag cover.

BACKGROUND

Airbags covers on a viewed side facing the vehicle interior should have a pleasant appearance, but on the other hand should also have a weakening which reliably breaks in the case of activation of the airbag. An attractive surface can be achieved by way of using real leather, but this material is more difficult to process than artificial leather or similar materials for example. Specifically, outlines of the incorporated weakening become apparent, at least under different climatic conditions, such as e.g. are present with a climate change test, on incorporating a weakening into the leather. Solutions which are suggested for this, such as a punching of the leather with a suitable tool, as has been suggested e.g. in DE 100 55 546 A1, however have the disadvantage that the introduced cuts can not only gape under the influence of the temperature, but the leather fibers can also be squashed and compressed, which on the viewed side leads to visibly greasy/shiny regions. With other methods such as perforation for example, a widening of a hole is effected, wherein leather fibers are quasi displaced and do not return into their initial shape. A continuous displacement of the leather fibers and an accordingly deeper cut for incorporating the desired weakening occurs when cutting into the leather, so that here too, the weakening can become visible.

SUMMARY

It can therefore be an objective to suggest a method for manufacturing a decor layer, as well as a decor layer, which overcome the mentioned disadvantages, which thus permit a decor layer of an airbag cover with a weakening structure which remains invisible at different climatic conditions and which despite this reliably breaks in the case of an activation of an airbag.

According to an embodiment of the invention, this objective can be achieved by a method according to claim 1 and a decor layer according to claim 10. Advantageous designs and further formations are described in the dependent claims.

With a method for creating a weakening structure which is invisible considered from a viewed side, in a decor layer of an airbag cover, a punching tool penetrates into a rear side of the decor layer which is away from the viewed side. The decor layer itself consists of leather. The punching tool simultaneously to the penetration is rotated about its longitudinal axis, and a penetration depth which is lower than the thickness of the decor layer is maintained.

The use of leather, i.e. real leather as a natural material, ensures a pleasing optical impression of the viewed side, which remains uninfluenced due to the penetration of the punching tool into the rear side. The introduced weakening layer remains invisible on the viewed side since the punching tool does not fully penetrate the decor layer. The leather fibers are reliably severed due to the superposition of the translatory penetration with a rotation of the punching tool, so that an adequate weakening of the decor layer is achieved, without excessively compressing or squashing the leather fibers. Moreover, due to the rotation, one does not need to cut too deeply into the leather, as with methods known from the state of the art. Moreover, there is enough space between individual points of the weakening structure, for the leather fibers to be able to return back into their initial form, thus can quasi "relax" again.

One can moreover envisage maintaining a penetration depth which corresponds maximally to a third of the thickness of the decor layer, in order on the one hand to cause a sufficient weakening of the decor layer and on the other hand for the weakening structure not to appear on the viewed side. Thus a residual wall thickness of two thirds remains at the position of the weakening structure.

The punching tool alternatively or additionally can be rotated in a region between 0° and 360° on penetration into the decor layer, typically however by at least 30°, preferably 60°, particularly preferably 90°, with the penetration into the decor layer, in order to improve the cut of the leather.

The punching tool can form at least two recesses which form the weakening structure. A type of perforation line is formed by way of this, along which line the decor layer can tear.

The mentioned recesses are typically formed with a diameter of maximal 0.2 mm, since the weakening structure can become visible on the viewed side in the case of larger diameters. The diameters of such round recesses however are at least 0.2 mm to 5 mm, in order to permit a reliable tearing of the decor layer.

Typically, the recesses each have the same distance to one another, in order to permit a uniform tearing. The distance between two recesses which are arranged next to one another, at the most is preferably as large as the diameter of the recesses, since a secure tearing is no longer ensured with a distance which is too large.

All recesses with regard to their geometric dimensions and their distance can be the same, but of course it can also alternatively be possible to design the recesses differently in pairs, i.e. in particular to envisage different distances between individual ones of the recesses, or different depths of the recesses.

An airbag flap, thus a geometric arrangement, can be formed by way of the production of the weakening structure, with which arrangement the decor layer tears at several locations on activating the airbag, but the connection to the remaining decor layer remains uninfluenced at least at one side of the arrangement, in order to prevent an uncontrolled ejection of the airbag flap in a vehicle interior.

The punching tool typically comprises a conically tapering end piece, wherein a cutter is formed at the location of the smallest diameter. A targeted introduction of force for the cutting can be effected due to the conical shape. Preferably, not only is the cutter, but the complete punching tool is formed in a rotationally symmetrical manner about the longitudinal axis, in order to simplify the rotation of the punching tool during the penetration into the decor layer.

The airbag cover which is produced with a method according to the described method can have a weakening structure, whose depth is smaller than the thickness of the decor layer.

BRIEF DESCRIPTION OF THE DRAWINGS

Embodiments of the invention are represented in the drawings and are hereinafter explained by way of FIGS. 1 and 3.

There are shown in.

DETAILED DESCRIPTION OF THE INVENTION

Figure 1:
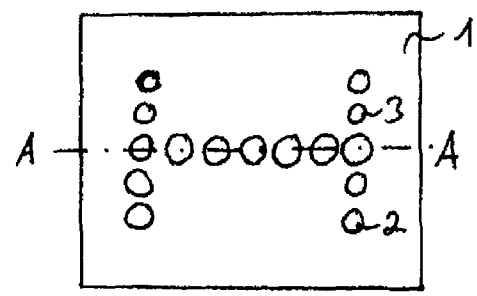
FIG. 1 a plan view of a decor layer with an introduced weakening structure.

FIG. 1 shows a plan view of a rear side of a decor layer 1 of real leather, which is provided with a weakening structure 2. The weakening structure 2 consists of several recesses 3 which are round. The recesses 3 are arranged along three lines, so that an H-shaped weakening structure 2 is formed. The weakening structure 2 can also be U-shaped in further embodiments.

A diameter of the recesses 3 which are equally large in each case is 0.2 mm and a distance between two of the recesses 3 is equally large in each case along the three lines. This distance is smaller than the diameter of the recesses 3. An airbag flap is formed by way of the arrangement of the recesses 3 and the weakening structure 2 which is formed by them.

The decor layer 1 is subsequently arranged on an inner trim part such as an instrument panel, and this inner trim part is installed into a vehicle interior. If an airbag located below the weakening structure 2 is activated in the case of an accident, then the weakening structure 2 is severed along the perforations formed by the recesses 3, and the airbag can expand or unfold into the vehicle interior.

Figure 2:
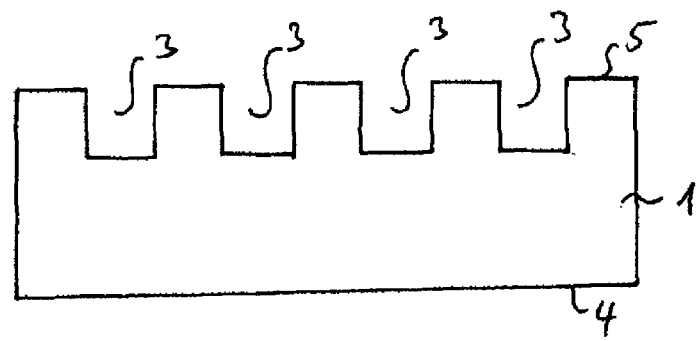
FIG. 2 a sectioned view of the decor layer shown in FIG. 1.

FIG. 2 shows the decor layer 1 which is represented in FIG. 1, in a sectioned representation along the line A-A drawn in FIG. 1. Recurring features in this as well as in the following figure are provided with identical reference numerals. The viewed side 4 which faces the vehicle interior after the installation is represented lying at the bottom in FIG. 2, and the rear side 5 is located opposite this at the upper end of the decor layer 1.

A depth of the recesses 3, as is shown in FIG. 2, is lower than a thickness of the decor layer 1, i.e. the recesses 3 are not designed in a continuous manner through the decor layer 1. In the shown example, the depth is a third of the thickness of the decor layer 1, and a residual wall thickness of the real leather at the position of the recesses 3 is accordingly two thirds of the thickness of the decor layer 1 which is defined by a distance between the viewed side 4 and the rear side 5. The recesses 3 with the represented decor layer 1 are manufactured by a method, with which a rotation in combination with a punching operation of a punching tool described in more detail hereinafter is carried out.

Hereby, the decor layer 1 as a leather cut part for the instrument panel is weakened at the rear side, by way of the hole punching tool incorporating the weakening structure 2 by way of rotation about its own axis on immersing into the leather. The hole punching tool can either be rotated back, rotated further again or remain in the now assumed position without further rotation, on withdrawal from the leather. The leather fibers can be removed more easily from the tool by way of an additional rotation on withdrawal. A penetration depth of the tool defines a depth of the recesses 3. No line of the weakening structure 2 is visible on the leather upper surface due to the partial weakening of the leather fibers, even after ageing.

Figure 3:
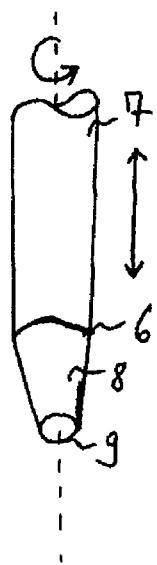
FIG. 3 a perspective view of a punching tool.

The hole punching tool 6 which merges from a cylinder-shaped upper part 7 into a conically tapering end piece 8 is represented in FIG. 3 in a perspective view. A circular cutter 9, by way of which the recesses 3 of the weakening structure 2 are created, is attached on the end of the end piece 8.

The hole punching tool 6 is rotationally symmetrical about its longitudinal axis which is drawn in a dashed manner and which indicates an axis of the greatest longitudinal extension and runs centrally through the cutter 9, the end piece 8 and the upper part 7. The rotation about 45° on punching the leather is also carried out about this axis, whilst the hole punching tool 6 is simultaneously moved in a translatory movement up and down along the longitudinal axis. A particularly efficient cutting effect is achieved with leather fibers due to a superposition of the rotation movement and translation movement.

Features of the different embodiments which are only disclosed in the embodiment examples can be combined with one another and claimed individually.

What is claimed is:

1. A method for manufacturing a weakening structure in a decor layer of an airbag cover, said weakening structure not being visible when observed from a viewed side, with which method a punching tool penetrates into a rear side of the decor layer comprising leather, said rear side being away from the viewed side, and thereby is simultaneously rotated about its longitudinal axis, and a penetration depth of the punching tool which is smaller than the thickness of the decor layer is maintained.

2. The method according to claim 1, wherein a penetration depth which corresponds maximally to a third of the thickness of the decor layer is maintained.

3. The method according to claim 1, wherein the punching tool on penetrating into the decor layer is rotated by at least 30°.

4. The method according to claim 1, wherein the punching tool forms at least two recesses which form the weakening structure.

5. The method according to claim 4, wherein round recesses are formed.

6. The method according to claim 4, wherein the recesses are formed with a diameter of maximal 0.2 mm.

7. The method according to claim 4, wherein the recesses each have an equally large distance to one another, wherein the distance between two recesses which are arranged next to one another at the most is as large as the diameter of the recesses.

8. The method according to claim 1, wherein an airbag flap is formed in the decor layer by way of the production of the weakening structure.

9. The method according to claim 1, wherein a conically tapering end part of the punching tool penetrates into the decor layer, wherein the punching tool is rotationally symmetrical.

10. A decor layer of leather for an airbag cover with a weakening structure, wherein a depth of the weakening structure is lower than a thickness of the decor layer, and the decor layer is manufactured with a method according to claim 1.

* * * * *